May 21, 1968
JAMES E. WEBB
ADMINISTRATOR OF THE NATIONAL AERONAUTICS
AND SPACE ADMINISTRATION
NOSE CONE MOUNTED HEAT-RESISTANT ANTENNA
3,384,895
Filed Jan. 19, 1966
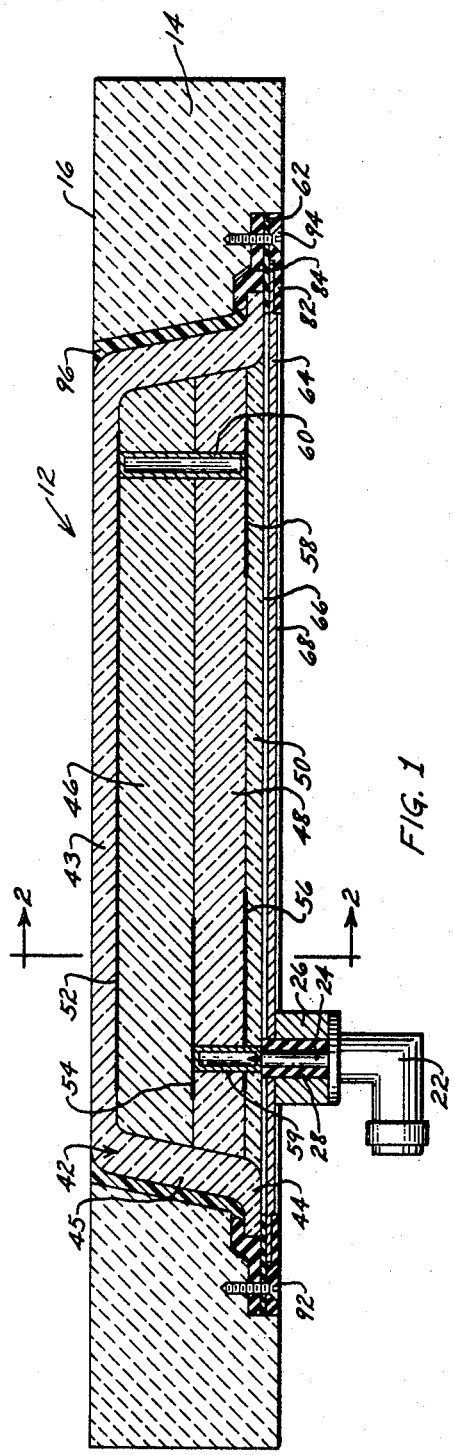
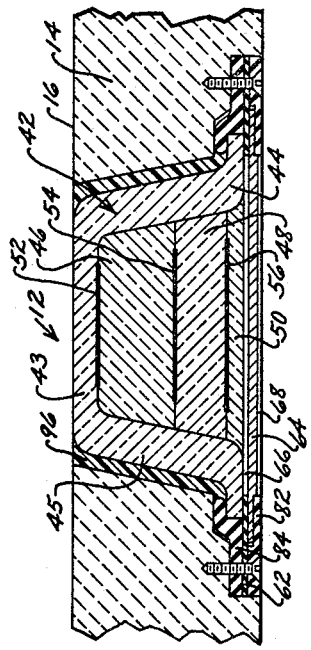
INVENTORS
ARTHUR DORNE
EUGENE E. SHUBE
BY
ATTORNEYS

United States Patent Office 3,384,895
Patented May 21, 1968

3,384,895
NOSE CONE MOUNTED HEAT-RESISTANT
ANTENNA
James E. Webb, Administrator of the National Aeronautics and Space Administration, with respect to an invention of Arthur Dorne, Sea Cliff, and Eugene E. Shube, Elmont, N.Y.
Filed Jan. 19, 1966, Ser. No. 521,754
5 Claims. (Cl. 343—708)

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates in general to antenna systems, more particularly to apparatus for mounting an antenna in a spacecraft subjected to high heat temperatures during earth entry.

In the Apollo spacecraft, which is composed of a command module and a service module, during the mission of the spacecraft in its orbit around the earth and its travel to the moon, it is necessary to maintain constant communication with ground stations on earth. While the antenna system for communication between the spacecraft and earth may be installed on the command module or the service module, by installing the antenna on the command module availability of the antenna is not terminated when the service module is jettisoned prior to reentry into the earth's atmosphere of the command module. However, command module installation of the antenna system poses many more problems than that of service module installation.

The command module is constructed of an inner pressure vessel containing the astronauts' compartment, and is surrounded by an outer structure shell separated from the inner vessel and made up of one-half inch stainless steel honeycomb sandwich. The entire command module is then covered by a heat shield of ablative material. The outer wall of the inner pressure vessel is thermally insulated from the outer structure shell and is at temperatures close to those of the astronauts' compartment. The ablative cover is of varying thickness around the capsule. However, in those regions of the spacecraft where antennas would be installed, the ablative cover is approximately 1.4 inches thick. A key design condition for a spacecraft antenna system is that the outer skin of the spacecraft remain below 600° F. during entry into the earth's atmosphere and that the outside surface of the inner pressure vessel remain below 200° F. Thus, the antennas must not introduce any thermally conducting paths, which would upset these conditions.

To design an antenna to reside beneath the ablative covering of the spacecraft and, therefore, be protected by the ablator would result in three main problems:

(1) The ablator is not controlled for its electrical characteristics and would be too lossy for high efficiency performance of the C-band and S-band antenna designs, and the losses would also reduce performance of the UHF and VHF antennas to some extent. Further, the dielectric constant of the ablator varies during the wide range of temperatures experienced during the space flight portion of the mission. These variations will tend to shift the operating bands of the antennas requiring that these operating bands be widened, which can only be offset by an increase in antenna size.

(2) The ablator may char during the earth exit phase of the space flight. Should this occur, C-band and S-band performance would be reduced to an unacceptable level. Further, the ablator will char during earth entry. Even if no charring occurs on exit, the C-band and S-band antennas would be disabled by the char covering, which would form during earth entry. While it is not mandatory that the antennas function during descent through the earth's atmosphere, such operation would enhance the mission.

(3) The usable space beneath the ablator is limited to 1.5 inches in depth over most of the spacecraft surface. Mechanical designs, which utilize the ablator for protection, must perform their electrical functions within the remaining 1.5 inches. These designs tend to get unacceptably large for UHF and VHF functions.

Should the antenna be designed to penetrate into the ablator or replace a portion of the ablator in order to minimize or eliminate the above described problems, the choice of dielectric materials is limited to those which would function well electrically, as well as resist the high temperature of entry. Most ablative materials, which have been designed for resistance to a high temperature environment, have either high loss tangents or char-forming tendencies since they have not been designed for optimum electrical characteristics.

In order to provide an antenna system which may be mounted in the heat shield of a spacecraft which is subject to high temperatures during an entry into an atmosphere, the antenna system of the present invention is formed of materials which may replace a portion of the heat shield of the spacecraft without subjecting the spacecraft to deleterious effects. The apparatus acts as a high effective heat shield while simultaneously the antenna elements, which are also good thermal conductors, do not introduce paths of high thermal conductivity through the ablative shield. The antenna elements are embedded in silica layers and achieve radiation patterns essentially as that which could be obtained with a similarly located radiator mounted in free space.

More particularly, the apparatus comprises a cup-shaped silica member whose outer end surface is flush with the outer surface of the heat shield. A first layer of silica has an outer surface side and an edge surface flush with the inner end surface and inner side wall of the cup-shaped member, respectively. Coated on the first layer outer surface adjacent the cup-shaped member inner end surface is a radiating element. A second layer of silica and a third layer of silica are mounted on said first and second layers of silica, respectively, with their edges flush with the inner side wall of said cup-shaped member. Coated on the second layer outer surface adjacent the first layer inner surface is a feed element, which is directly connected to a coaxial connector by means of a first highly conductive member which protrudes through the second and third silica layers. The feed element and radiating element are capacitively coupled to each other so as to prevent a highly conductive heat path. Further, a heat sink, which is mounted in a plane parallel to and adjacent to the third layer, is separated therefrom by an air gap which forms an insulating layer. A first conductive element coated on the surface of the third silica layer surface adjacent the second silica layer is connected to the first highly conductive member to form a shunt capacitor. A second conductive element is coated on the third silica layer surface adjacent the second silica layer and is connected to the radiating element by means of a second highly conductive member to form a terminating capacitor. A flange portion of cup-shaped member is secured to a pair of insulating flanges together with the heat sink. The entire apparatus is then placed in a removed portion of the heat shield as a section thereof.

The advantage of this invention, both as to its construction and mode of operation, will be readily appreciated as the same become better understood by reference to the following detailed description when considered in connection with the accompanying drawings in which like reference numerals designate like parts throughout the figures, and wherein:

FIG. 1 is a side view, partly in section, of a novel antenna in accordance with this invention; and FIG. 2 is an end view, partly in section, of the antenna of FIG. 1, taken along the line 2–2 of FIG. 1.

Referring now to the drawings, there is shown in FIGS. 1 and 2 an antenna system which is used to transmit energy from a spacecraft employing an embodiment of the novel apparatus in accordance with this invention.

An antenna 12 is designed to be flush mounted in a portion of an ablative heat shield 14, which forms the outer layer of a space vehicle. The primary purpose of the heat shield is to protect the space vehicle, which is subjected to large amounts of heat upon entry into an atmosphere, from having the heat transferred to the interior of the spacecraft. To provide communication between the spacecraft and a ground station, a portion of the heat shield 14 is removed and the antenna 12 is mounted therein, the outer surface of the antenna being flush with the outer surface 16 of the heat shield. Electrical signals are coupled to and from the spacecraft to the antenna through a coaxial connector 22 having an inner conductor 24 and an outer conductor 26, the inner and outer conductors being spaced apart by an insulating member 28.

The antenna structure comprises a sup-shaped silica member 42, the outer surface of the end portion 43 thereof being flush with the outer surface 16 of the heat shield. The member 42 further comprises a flange portion 44 and a side portion 45 which interconnects the end portion 43 to the flange portion 44. A first silica layer 46, a second silica layer 48, and a third silica layer 50 are stacked upon one another and are flush mounted within the cup-shaped member 42. The member 42 and layers 46, 48, and 50 are formed of multiform fused silica, such as Corning Glass code 7941. This material offers very low loss, acceptable dielectric constant, low thermal diffusitivity, and extremely stable properties over the temperature range of interest.

A first metallic layer 52, which forms the antenna radiating element, is coated on the outer surface side of the first silica layer 46 and sandwiched between the silica layer 46 and end portion 43. A second metallic layer 54, which forms the antenna feed element, is coated on the outer surface side of silica layer 48 and sandwiched between silica layers 46 and 48. A third metallic layer 56 and a fourth metallic layer 58 are coated on the outer surface side of layer 50 and sandwiched between silica layers 48 and 50. Each of the metallic layers may be formed of such materials as copper, silver, or platinum. The silica layers are made substantially wider than the metallic layers, so that the heat shield 14 is not immediately adjacent to the antenna and variations of the dielectric constant of the heat shield with changes in temperature will not adversely affect the tuning of the antenna.

The inner conductor 24 is connected to a first highly conductive tubular member 59, which protrudes through the silica layers 48 and 50, and is electrically connected to the metallic layers 54 and 56. A second highly conductive tubular member 60 protrudes through the silica layers 46 and 48, and is used to interconnect the metallic layers 52 and 58 at one end thereof.

After the metallic layers 52, 54, 56, and 58 are coated on their respective silica layers, the silica member 42 and layers 46, 48, and 50 are fused together. The fused silica member and layers are then placed on an insulating spacer 62 at the flange 44 of member 42. Then a heat sink 64 is secured to the other side of the flange. Between the silica layer 50 and the heat sink is an air gap 66, which forms an insulating layer between the silica members and the heat sink. A pair of insulating flanges 82, 84 are used to secure the flange 44, the insulating spacer 62, and the heat sink 64 together. The heat sink 64 is slightly recessed at its inner surface side so that an air gap 68 would be formed between the spacecraft body (not shown) and the heat sink to form an insulating layer. The fused layers of silica and the heat sink 64 are then placed in an opening in the heat shield and secured thereto by means of metal screws 92, 94, which pass through the flanges 82, 84 and the insulating spacer 62 to the heat shield 14.

The insulating spacer 62 and the insulating flanges 82, 84 may be made of material such as Imidite 1850 Fiberglas laminate, whose chemical composition is polybenzimidazole, and whose characteristics are low thermal conductivity and short time temperature resistance to 1200° F. The heat sink is formed of a material such as gold-plated beryllium which reflects the radiative component of heat passing through the silica.

After the antenna package is assembled and placed in the heat shield, a resilient sealer 96, such as Dow-Corning 325 compound, is filled in the space between the silica member 42 and the heat shield 14 to absorb the difference in linear dimensions between the heat shield and the antenna arising from thermal and mechanical distortions of the spacecraft.

As can be readily seen, the second metallic layer 54, which forms the feed element for the antenna, is capacitively coupled to the first metallic layer 52, which forms the radiating element for the antenna. Further, the fourth metallic layer 58 forms a terminating capacitance with the heat sink 64, and the third metallic layer 56 forms a shunt capacitor with the heat sink 64. The geometries and dimensions of these capacitive elements are selected such that the impedance looking into the antenna from the coaxial connector 22 is of a proper value to essentially match the characteristic impedance of the transmission line leading to the antenna. With the proper match in effect, the performance of the antenna is enhanced while simultaneously removing the necessity for network elements, which would otherwise be needed to perform the impedance matching of the antenna. Correction of the mismatch will require additional circuitry thus reducing the efficiency of the radiating system.

The electrical performance of the antenna is not significantly deteriorated by the dielectric material surrounding it since it utilizes a shunt capacitance as the input matching element. The dielectric material increases the value of this capacitance and thereby becomes part of the matching network. If, however, the antenna did not utilize such a shunt capacitance, it would be severely degraded if the antenna were emersed in dielectric.

The design of the antenna disposed entirely within the window itself creates a few unusual problems because most of the conductive elements lie along isothermal lines. The electrical design of the antenna requires that the highly conductive members 59, 60 cross through the silica layers in several places. These cross conductors are normally made very thin so as to carry as little heat as possible and are made in tubular form to minimize electrical inductance in the elements.

While the antenna elements have been shown to be embedded in the silica rather than the ablative material, this is not essential to the invention. However, presently available ablative materials do not have sufficiently stable electrical properties nor low enough coefficients of thermal expansion to permit antennas of the type directly embedded therein to operate well over a wide temperature range.

The cup-shaped member 42 also performs the function of securing the layers 46, 48, and 50 so that should the layers become loose, they still remain secure due to the wedge-shaped side portion 45.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. An antenna adapted to be mounted in the heat shield of a spacecraft comprising:
    a plurality of adjacent layers of dielectric material;
    a radiating element embedded between the outermost layer and the second layer of said dielectric material;
    a feed element embedded between said second layer and a third layer;
    input means connected to a source of electrical signals for coupling said electrical signals to said feed element comprising an input connector secured to one of said layers;
    a heat sink secured to said layers and spaced therefrom for reflecting radiative heat away from said spacecraft, said spacing providing an insulating layer between the innermost layer and said heat sink; and
    means embedded in said layers for matching said input means to said antenna.

2. An antenna in accordance with claim 1 wherein said dielectric layers are formed of silica.

3. An antenna in accordance with claim 1 wherein said matching means comprise a shunt capacitor, said shunt capacitor being formed by a conductive element embedded in said layers and being connected to said input means.

4. An antenna in accordance with claim 3 and further comprising a terminating capacitor, said terminating capacitor being formed by a conductive member embedded in said layers and being connected to said radiating element.

5. An antenna in accordance with claim 3 and further comprising means for securing said layers to said heat shield comprising a dielectric side member surrounding said layers and being integral with said outermost layer, said edges of said layers being flush with said side member, and a pair of flanges securing said side member to said heat sink.

References Cited

UNITED STATES PATENTS

| | | | |
|---|---|---|---|
| 3,310,807 | 3/1967 | Kofoid | 343—705 |
| 3,346,865 | 10/1967 | Jones | 343—708 |

ELI LIEBERMAN, *Primary Examiner.*